Nov. 20, 1934.　　　　G. ZAPF　　　　1,981,535
OIL FILLED HIGH VOLTAGE CABLE
Filed Aug. 8, 1930
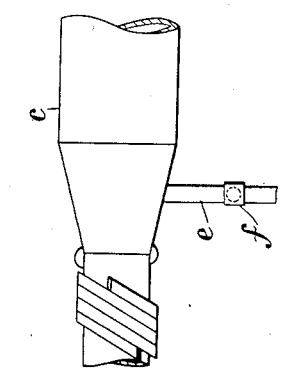
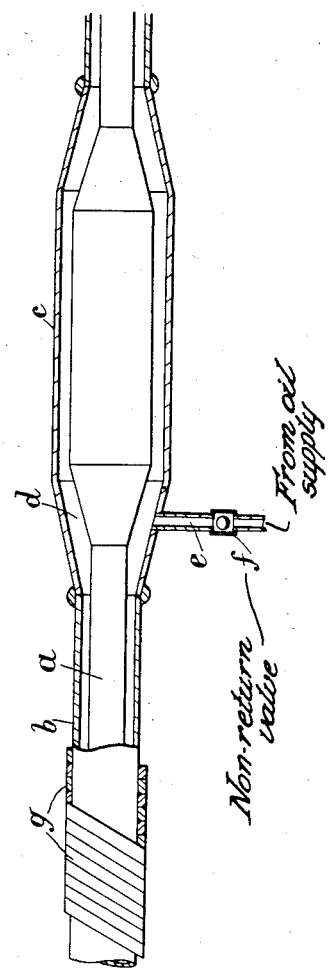
G. Zapf
INVENTOR
By: Marks & Clerk
ATTYS.

Patented Nov. 20, 1934

1,981,535

UNITED STATES PATENT OFFICE 1,981,535

OIL-FILLED HIGH VOLTAGE CABLE

Georg Zapf, Cologne, Germany, assignor to Felten & Guilleaume Carlswerk Actien-Gesellschaft, Cologne-Mulheim, Germany Application August 8, 1930, Serial No. 473,969
In Germany August 20, 1929

3 Claims. (Cl. 173—264)

It is known that the dielectric strength of an insulating material can be increased by increasing the pressure exerted thereon. With this object in view oil-filled high voltage cables have hitherto been connected to oil feeding pipes under pressure.

According to the present invention the expansion of the oil produced by the increase in temperature during the operation of oil-filled high tension cables is utilized for increasing the pressure. With this object in view the oil feeding pipes connected with the oil-filled cables are provided with non-return valves so that when the oil expands owing to the increase in temperature during the loading of the cable the return flow of oil is prevented whereby an increase in pressure in the oil present in the cable is produced. At the same time, should a fault arise which would cause a leakage of oil, the cable is continuously kept filled with oil through the said non-return valves, which are then open.

In order to impart sufficient strength to the cables used in such installations with respect to the internal increased pressure the steel band or steel wire armouring is provided directly on the lead sheathing, that is to say, without the interposition of any cushioning. In the case of multi-conductor cables preferably no strands are inserted in the gusset-shaped places between the individual cable conductors and the intervening spaces are filled with oil.

The accompanying drawing illustrates partly in elevation and partly in sectional elevation a high voltage cable installation according to the invention and consisting of a cable, junction casing and oil feeding pipes. $a$ is the insulated cable conductor or the thickened junction of conductors, $b$ is the lead sheathing, $c$ is the lead junction casing and $d$ is the inner space of the cable which is filled with oil. In the oil inlet pipe $e$ leading to the interior of the cable there is placed a non-return valve $f$. The steel band or steel wire armouring $g$ is provided directly on the lead sheathing $b$.

It will be noted that the insulated conductor $a$ does not completely fill the enclosure $b$ and joint casing $c$ which latter is connected at its ends to those of the adjacent enclosures, and that by reason of this arrangement a space $d$ extending longitudinally of the cable is provided which is filled with oil from the source of supply. The oil is confined within the space $d$ by the non-return valve $f$ in the supply pipe $e$, and hence as the oil expands with an increase of temperature due to the load on the cable, it exerts an increasing pressure on the insulation of the conductor, thereby increasing the dielectric strength of said insulation. If for any reason the amount of oil within the enclosure is insufficient to completely fill it, the valve $f$, illustrated diagrammatically, will open inwardly and permit oil to flow into the enclosure from the source of supply. An advantage in making the enclosure $b$ of lead resides in the fact that it can be made in relatively long lengths without joints, thus reducing the labor of installing, and since the number of joints in a given section will thereby be decreased, the danger of leaks is correspondingly reduced. By covering the lead enclosure with an armour such as $g$, the advantage is obtained that it will withstand increase of internal pressure due to expansion of the oil. A further advantage resides in the fact that the enclosure with its contained conductor may be bent at will, the armouring serving to prevent the collapse of the wall of the enclosure.

What I claim is:

1. A high tension cable installation comprising in combination an oil-filled high tension cable, oil storing means and pipes connecting said oil storing means with the oil-filled cable to maintain the oil supply in said cable, non-return valves in all of said pipes preventing an outward flow of oil so that on an increase of temperature in the cable the pressure is increased.

2. A high tension cable installation comprising in combination a high tension insulated conductor, an enclosure for the conductor, the space within the enclosure not occupied by the conductor being filled with oil, pipes connecting the enclosure with oil supply means, and non-return valves in said pipes preventing an outward flow of oil from the enclosure whereby an increase of temperature of the conductor causes an increase of the oil pressure on the insulation thereof.

3. A high tension cable installation comprising in combination a high tension insulated conductor, a lead enclosure for the conductor in spaced relation thereto, the space within the enclosure not occupied by the conductor being filled with oil, an armouring for the enclosure, pipes connecting the enclosure with oil supply means, and non-return valves in said pipes preventing an outward flow of oil from the enclosure whereby an increase of temperature of the conductor causes an increase of the oil pressure within the enclosure on the insulation of the conductor.

GEORG ZAPF.